Patented Dec. 21, 1948

2,456,628

UNITED STATES PATENT OFFICE 2,456,628

CONDENSATION OF POLYMERIZED FURFURYL ALCOHOL WITH A HYDROXYBENZENE

Andrew P. Dunlop, Riverside, Ill., and Edward A. Reineck, Appleton, Wis., assignors to The Quaker Oats Company, Chicago, Ill., a corporation of New Jersey No Drawing. Application August 21, 1944, Serial No. 550,491

8 Claims. (Cl. 260—47)

The present invention relates to resinous condensation products derived from furfuryl alcohol.

The invention is particularly concerned with new and useful resinous products obtained by condensing a compound containing at least one phenolic hydroxyl group with a condensation-resinification product of furfuryl alcohol.

Suitable phenolic compounds are, for example, phenol, cresol, resorcinol and similar hydroxybenzene compounds having a plurality of unsubstituted reactive nuclear positions and no other reactive group than the phenolic hydroxy group.

The furfuryl alcohol condensation-resinification products are in effect condensation products prepared by the action on furfuryl alcohol of heat alone, or of heat and acid reacting catalysts. The exact nature of these furfuryl alcohol condensation-resinification products is not at present precisely known, but it is known that intermolecular dehydration and possibly some polymerization are involved. It is well known, however, that furfuryl alcohol is a very reactive substance. In fact, strong acids cause its almost immediate resinification to a resinous state, the reaction being definitely exothermic.

By reason of this exothermic nature of the reaction, it is usually not necessary, when using acid reacting catalysts, to supply heat, unless they are used in very small amounts or greatly diluted, or else when they are acids which are not very avid. Suitable catalysts will be described hereinafter.

Therefore, the primary object of the present invention is to first form condensation-resinification products of furfuryl alcohol with itself, and then to combine the said products with phenolic substances to form more complex condensation products, which are also resinous in nature.

A further object of the invention relates to the processes of accomplishing the results set forth in the paragraph immediately preceding.

For the production of the furfuryl alcohol condensation-resinification products suitable catalysts which may be used comprise both mineral and organic carboxylic and sulfonic acids or salts thereof, which yield an acid reaction during the course of the resinification. Thus, there may be used such acids as phosphoric, lactic, oxalic, and paratoluenesulfonic, or such salts as calcium chloride, ferric chloride, and inorganic compounds such as boron trifluoride, iodine, etc. In any event, the furfuryl alcohol undergoes chemical and physical changes to yield a mixture of condensation and resinification products.

It has been found by the inventors that these furfuryl alcohol self-condensation products may be condensed with phenolic compounds. Alternatively the furfuryl alcohol products may be separated by suitable means into substances of relatively lower and higher molecular weights and the thus separated products individually subjected to condensation with a phenolic compound.

Furthermore, for instance, if a catalyst has been employed in the preparation of the furfuryl alcohol condensation-resinification product, such catalyst may be neutralized or removed by suitable means prior to the carrying out of the final condensation step with the phenolic compound.

The reaction between the furfuryl alcohol condensation-resinification product and the phenolic compound may be accomplished through the agency of heat alone, or it may be accelerated by employing acid or acid reacting catalysts in either concentrated form or in dilute solution. Suitable catalysts are similar to those already mentioned hereinabove.

The resins obtained may, if desired, be still further modified by condensation with aldehydes, such for example as furfural or formaldehyde.

In all of the cases the resins obtained are of the kind which are soluble in various solvents such as acetone, ethyl acetate, etc. The resins are also capable of being hardened by heat or by acidic substances and may be used together with the usual accelerators and fillers for the preparation of molding powders, laminating varnishes, and the like.

Without in any way limiting the present invention and purely for purposes of illustration, a number of examples will be given. It will be noticed that in some instances the furfuryl alcohol condensation-resinification product (hereinafter for simplicity termed "resinification product") is produced by the agency of heat alone, while in other cases it is formed with the aid of catalysts. In addition, the condensation with the phenolic compound is sometimes accomplished by heat alone and in other examples by using a catalyst.

EXAMPLE 1

650 parts of furfuryl alcohol was refluxed without any added catalyst, using an air condenser, for 264 hours. This yielded 607 parts of a liquid resin having a viscosity of from 7 to 7.5 times that of the original furfuryl alcohol. 250 parts of this resin was mixed with 94 parts of phenol and heated in a closed system. The heating schedule was 2 hours, during which the product was gradually raised from 30° C. to 200° C., followed by 2 hours at 200° C.–205° C. to yield a viscous resin.

A molding compound was prepared, using equal parts of the resin and white pine flour along with 20% hexamethylenetetramine (based on resin weight), by mixing, and then milling at 280° F. for 5 minutes, and then grinding. The resulting powder was molded at 320° F., and 2000 pounds per square inch for 5 minutes to yield a molded product having a tensile strength of 6980 pounds per square inch. The water absorption (24 hour immersion) of the molded piece was found to be 0.6%.

In addition a resin varnish was prepared and evaluated by preparing paper-base laminates at two different pressures. The conditions and test results were as shown in Table I.

Table I

|  | A | B |
|---|---|---|
| Resin, per cent | 43 | 38 |
| Hexamethylenetetramine (per cent based on resin wt.) | 20 | 20 |
| Volatile, per cent | 4.2 | 3.7 |
| Pressing conditions: |  |  |
| Degrees Fahrenheit | 300 | 300 |
| Minutes | 30 | 30 |
| Pounds per square inch | 100 | 1,000 |
| Specific gravity | 1.37 | 1.41 |
| Tensile, p. s. i | 21,750 | 23,750 |
| Flexure, p. s. i |  | 25,900 |
| Mod. of Elasticity p. s. i. ×10⁶ (tension) | 2.00 | 2.05 |
| Notched Charpy impact, ft. lb./in | 0.53 | 0.57 |

EXAMPLE 2

330 parts of furfuryl alcohol resinification product (same as in Example 1) were heated under reflux at 100–105° C. for 4½ hours with 165 parts of resorcinol and 1 part of calcium chloride in 25 parts of water. This yielded 500 parts of a viscous resin which was soluble in acetone and ethyl acetate. This resin was used in the preparation of a molding compound and a laminating varnish as shown below:

Molding compound: Equal parts of resin and white pine flour and 15% hexamethylenetetramine (based on the resin weight) were mixed, and then milled at 230° F., for 1.25 minutes. After grinding, the powder was molded at 320° F., and 2000 pounds per square inch for 3 minutes to yield a molded product having a tensile strength of 7370 pounds per square inch, the water absorption of which after 24 hours immersion was only 0.35%.

Paper base laminates: The laminating varnish was used to impregnate paper sheets which were then consolidated under a varying set of pressing conditions to yield boards having the following properties as shown in Table II.

Table II

|  | A | B |
|---|---|---|
| Resin, per cent | 40 | 38 |
| Hexamethylenetetramine (per cent based on resin wt.) | 20 | 20 |
| Volatile, per cent | 3.5 | 2.2 |
| Pressing conditions: |  |  |
| Degrees Fahrenheit | 300 | 300 |
| Minutes | 12 | 12 |
| Pounds per square inch | 100 | 1,000 |
| Specific gravity | 1.27 | 1.42 |
| Tensile, p. s. i | 22,150 | 26,700 |
| Flexure, p. s. i | 26,000 | 30,900 |
| Mod. of Elasticity p. s. i. ×10⁶ (tension) | 2.22 | 2.50 |
| Notched Charpy impact, ft. lb./in | 0.48 | 0.55 |

EXAMPLE 3

500 parts of furfuryl alcohol and 25 parts of 85% lactic acid were heated at 100–110° C., for 5½ hours. This yielded a furfuryl alcohol resinification product having a viscosity about 2.5 times that of the original solution. 141 parts of phenol were added and the mixture was heated at 100–100° C., for 8½ hours (reflux condenser attached). The resulting viscous resin was used as in Examples 1 and 2 with the results as shown in Table III.

Molding compound—A molding compound was prepared as in Example 1, except that the milling conditions were 3 minutes at 285° F. Molding at 320° F. and 2000 pounds per square inch for 5 minutes yielded products having a tensile strength of 7490 pounds per square inch. The water absorption value was 2.0% (24 hour immersion).

Paper base laminates: The laminates obtained are described below:

Table III

|  | I | II |
|---|---|---|
| Resin, per cent | 40 | 37 |
| Hexamethylenetetramine (per cent based on resin wt.) | 20 | 20 |
| Pressing Conditions: |  |  |
| Degrees Fahrenheit | 300 | 300 |
| Minutes | 30 | 30 |
| Pounds per square inch | 100 | 1,000 |
| Specific Gravity | 1.23 | 1.39 |
| Tensile, p. s. i | 19,900 | 19,900 |
| Flexure, p. s. i | 25,325 | 24,325 |
| Mod. of Elasticity p. s. i. ×10⁶ (tension) | 2.00 | 1.75 |
| Notched Charpy impact, ft. lb./in | 0.78 | 0.83 |

EXAMPLE 4

300 parts of furfuryl alcohol containing 8 parts of a solution of boron trifluoride in methanol (100 parts of methanol containing 8.1 parts of boron trifluoride) were stirred and maintained at 10–13° C., for 120 hours. This yielded a green colored, viscous resin. The catalyst was destroyed by addition of alkali. The resin was divided into portions and treated as follows:

1. 50 parts of the just mentioned furfuryl alcohol resin were condensed with 23.5 parts of phenol, using dilute aqueous phosphoric acid as the catalyst, and heating at 95° C. for 7 hours. This treatment yielded a viscous resin which hardened on further heating to an infusible, insoluble condition.

2. 212 parts of the said furfuryl alcohol resin were distilled under vacuum to remove low molecular weight products. This yielded 118 parts of relatively high molecular weight condensation products. 50 parts of the latter were treated with 23.5 parts of phenol as in part 1 of the present example, and a viscous resin was obtained which cured on heating to an infusible, insoluble product.

It will of course be obvious that various modifications may be made within the skill of organic chemists who are familiar with the preparation of organic condensation products of the type herein enumerated and described. Accordingly applicants claim;

1. The process of producing a new thermosetting resin which consists in mixing an hydroxybenzene having a plurality of unsubstituted reactive nuclear positions and no other reactive group than the phenolic hydroxy group with a partial condensation-resinification product derived from the condensation of furfuryl alcohol with itself and condensing the aforesaid reactants under the influence of heat until the said resin is formed.

2. The process of producing a new thermosetting resin which consists in mixing phenol and a partial condensation-resinification product derived from the condensation of furfuryl alcohol with itself and condensing the aforesaid reactants under the influence of heat until the said resin is formed.

3. The process of producing a new thermosetting resin which consists in mixing resorcinol and a partial condensation-resinification product derived from the condensation of furfuryl alcohol with itself and condensing the aforesaid reactants under the influence of heat until the said resin is formed.

4. The process of producing a new thermosetting resin which consists in mixing an hydroxybenzene having a plurality of unsubstituted reactive nuclear positions and no other reactive group than the phenolic hydroxy group with a partial condensation-resinification product derived from the condensation of furfuryl alcohol with itself and condensing the aforesaid reactants under the influence of heat in the presence of an acidic catalyst until the said resin is formed.

5. The process of producing a new thermosetting resin which consists in mixing an hydroxybenzene having a plurality of unsubstituted reactive nuclear positions and no other reactive group than the phenolic hydroxy group with a partial condensation-resinification product derived from the condensation of furfuryl alcohol with itself and condensing the aforesaid reactants under the influence of heat in the absence of a catalyst until the said resin is formed.

6. The process of producing a new thermosetting resin which consists in heating furfuryl alcohol under a reflux condenser until a viscous, partially resinified, furfuryl alcohol product is formed, and condensing said product with an hydroxybenzene having a plurality of unsubstituted reactive nuclear positions and no other reactive group than the phenolic hydroxy group under the influence of heat alone until the said resin is formed.

7. The process of claim 4 in which the catalyst is boron trifluoride.

8. The process of claim 4 in which the catalyst is calcium chloride.

ANDREW P. DUNLOP.
EDWARD A. REINECK.

REFERENCES CITED

The following references are of record in the file of this patent:

UNITED STATES PATENTS

| Number | Name | Date |
|---|---|---|
| 2,323,334 | Kauth | July 6, 1943 |
| 2,343,973 | Harvey | Mar. 14, 1944 |
| 2,383,790 | Harvey | Aug. 28, 1945 |

OTHER REFERENCES

Brauns-Technical Association of the Pulp and Paper Industry, Oct. 3, 1940, pages 33–39.